UNITED STATES PATENT OFFICE.

ARTHUR D. LE ROY AND CHARLES A. LOWELL, OF CORTLAND, NEW YORK.

WELDING COMPOUND.

SPECIFICATION forming part of Letters Patent No. 428,114, dated May 20, 1890.

Application filed March 5, 1890. Serial No. 342,787. (No specimens.)

*To all whom it may concern:*

Be it known that we, ARTHUR D. LE ROY and CHARLES A. LOWELL, citizens of the United States, residing at Cortland, in the county of Cortland and State of New York, have invented a new and useful Composition of Matter for the Welding of Steel, of which the following is a specification.

Our composition consists of the following ingredients combined in the proportions stated, viz: heating-furnace cinder, (pulverized,) two parts; iron drillings, two parts; pulverized borax, one part. These ingredients are to be thoroughly mingled by agitation, then subjected to heat sufficient to melt the borax, which will flow, adhering cinder, iron drillings, and borax, then run through a mill, crushing it, leaving it ready for use.

By the use of the above composition steel can be welded as easily as iron and at less expense than with other compounds.

A striking advantage of our composition is that the flux derived from the heating-furnace cinder is superior to that of borax, of which we only use enough to unite the ingredients, as set forth.

We are aware that a composition consisting of ground iron and borax has been used for the same purpose, and that a patent therefor was granted to Hermann Schierloh, February 10, 1874, No. 147,576; but we are not aware that all of the ingredients of our composition in the proportion stated have been used together.

What we claim, and desire to secure by Letters Patent of the United States, is—

The herein-described composition of matter to be used for a welding compound, consisting of heating-furnace cinder, iron drillings, and borax, in the proportions specified.

Dated March 1, 1890.

ARTHUR D. LE ROY.
CHARLES A. LOWELL.

Witnesses:
DANIEL GEER,
JEROME SQUIRES.